(12) United States Patent
Yoon et al.

(10) Patent No.: US 7,956,966 B2
(45) Date of Patent: *Jun. 7, 2011

(54) VERY THIN ACHROMATIC QUARTER WAVE FILM LAMINATE FOR TRANSFLECTIVE LCD AND METHOD FOR PRODUCING THE SAME

(75) Inventors: Hyuk Yoon, Gyunggi-do (KR); Je-Hyuk Yoo, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 131 days.

This patent is subject to a terminal disclaimer.

(21) Appl. No.: 12/223,258

(22) PCT Filed: Feb. 26, 2007

(86) PCT No.: PCT/KR2007/000968
§ 371 (c)(1),
(2), (4) Date: Jul. 25, 2008

(87) PCT Pub. No.: WO2007/097595
PCT Pub. Date: Aug. 30, 2007

(65) Prior Publication Data
US 2010/0053520 A1  Mar. 4, 2010

(30) Foreign Application Priority Data
Feb. 27, 2006 (KR) .................. 10-2006-0018746

(51) Int. Cl.
G02F 1/1335 (2006.01)
(52) U.S. Cl. .................. 349/119; 349/117; 349/118

(58) Field of Classification Search ........... 349/117–119
See application file for complete search history.

(56) References Cited

U.S. PATENT DOCUMENTS

| | | | | |
|---|---|---|---|---|
| 4,125,319 A * | 11/1978 | Frank et al. | ................... | 359/296 |
| 5,688,436 A | 11/1997 | Ohnishi et al. | | |
| 6,103,323 A | 8/2000 | Motomura et al. | | |
| 6,144,433 A * | 11/2000 | Tillin et al. | ................... | 349/123 |
| 6,380,997 B1 * | 4/2002 | Sharp et al. | ................... | 349/119 |
| 6,400,433 B1 | 6/2002 | Arakawa et al. | | |
| 6,569,972 B1 | 5/2003 | Choi et al. | | |
| 6,717,642 B2 | 4/2004 | Sasaki et al. | | |
| 6,760,157 B1 | 7/2004 | Allen et al. | | |
| 7,663,718 B2 * | 2/2010 | Yoon et al. | ................... | 349/122 |
| 2002/0187283 A1 | 12/2002 | Gu et al. | | |
| 2003/0164905 A1 | 9/2003 | Yamaoka et al. | | |
| 2004/0032677 A1 | 2/2004 | Su et al. | | |
| 2005/0280767 A1 | 12/2005 | Chen et al. | | |
| 2006/0092349 A1 | 5/2006 | Moriya et al. | | |
| 2006/0159865 A1 | 7/2006 | Kim et al. | | |
| 2007/0166482 A1 | 7/2007 | Kim et al. | | |

FOREIGN PATENT DOCUMENTS

| | | | |
|---|---|---|---|
| JP | 01090405 A * | 4/1989 | |
| JP | 06-242317 | 9/1994 | |
| JP | 2000-235117 | 8/2000 | |

(Continued)

*Primary Examiner* — Julie-Huyen L Ngo
(74) *Attorney, Agent, or Firm* — McKenna Long & Aldridge LLP

(57) ABSTRACT

Disclosed herein is an very thin achromatic quarter wave film laminate for transflective LCD included in an LCD polarizer. More specifically, the very thin achromatic quarter wave film laminate for transflective LCD has a considerably reduced thickness, as compared to conventional quarter wave films in which anisotropic polymeric films are laminated.

8 Claims, 8 Drawing Sheets

FOREIGN PATENT DOCUMENTS

| | | |
|---|---|---|
| JP | 2001-200018 | 7/2001 |
| JP | 2001-337225 | 12/2001 |
| JP | 2002-372623 | 12/2002 |
| JP | 2003-057659 | 2/2003 |
| JP | 2003-262728 | 9/2003 |
| JP | 2004-077719 | 3/2004 |
| JP | 2004-151310 | 5/2004 |
| JP | 2004-226686 | 8/2004 |
| JP | 2004-317611 | 11/2004 |
| JP | 2006-048023 | 2/2006 |
| JP | 2006-512597 | 4/2006 |
| JP | 2006-267671 | 10/2006 |
| JP | 2008-503790 | 2/2008 |
| KR | 100220237 B1 | 6/1999 |
| KR | 10-1999-0003515 | 9/2000 |
| KR | 2003-0030956 | 4/2003 |
| KR | 10-2006-0012119 | 2/2006 |
| WO | WO 2004/025338 A1 | 3/2004 |
| WO | WO 2004/041925 A1 | 5/2004 |
| WO | WO 2007/097595 | 8/2007 |
| WO | WO 2007/097596 | 8/2007 |

* cited by examiner

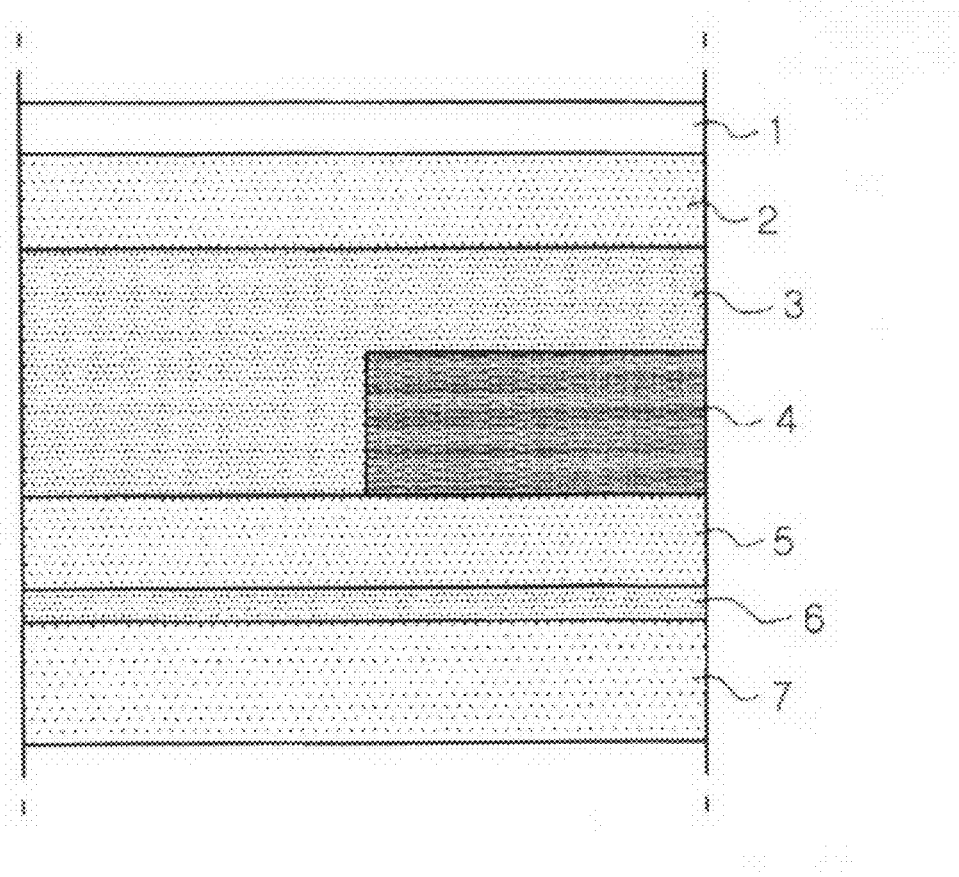

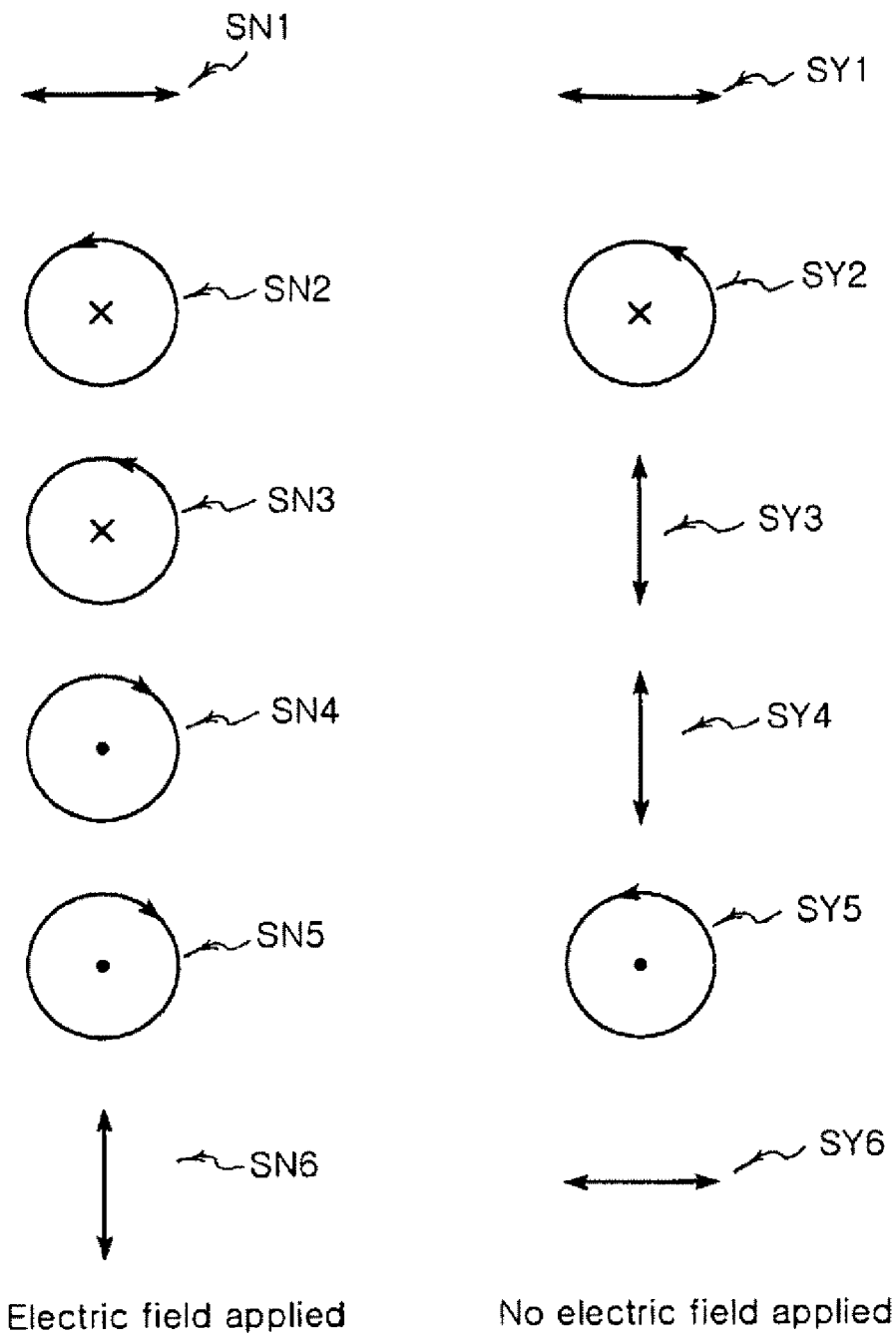

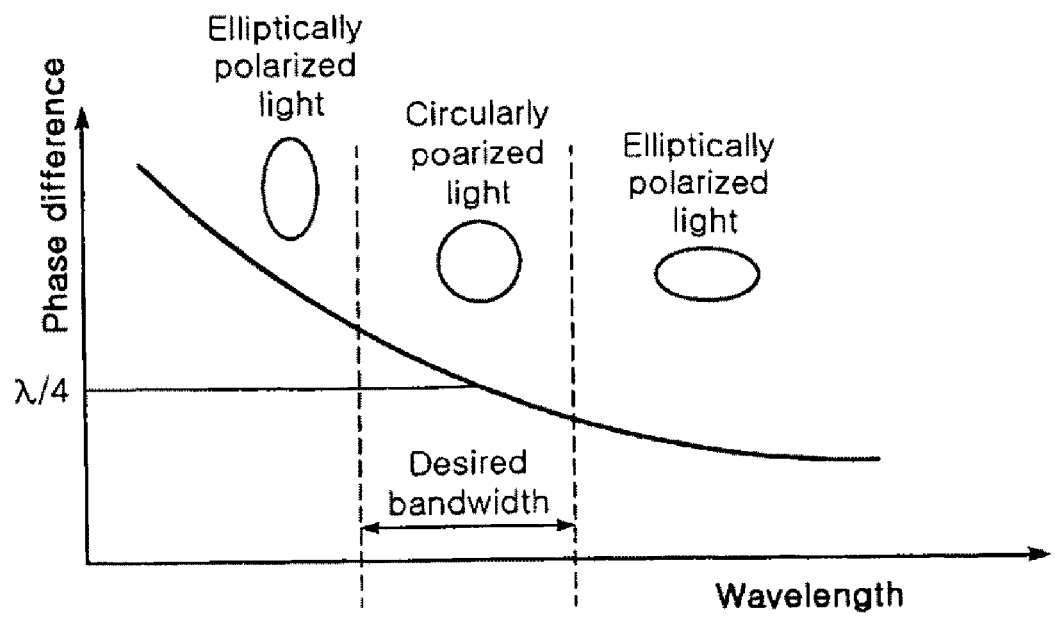

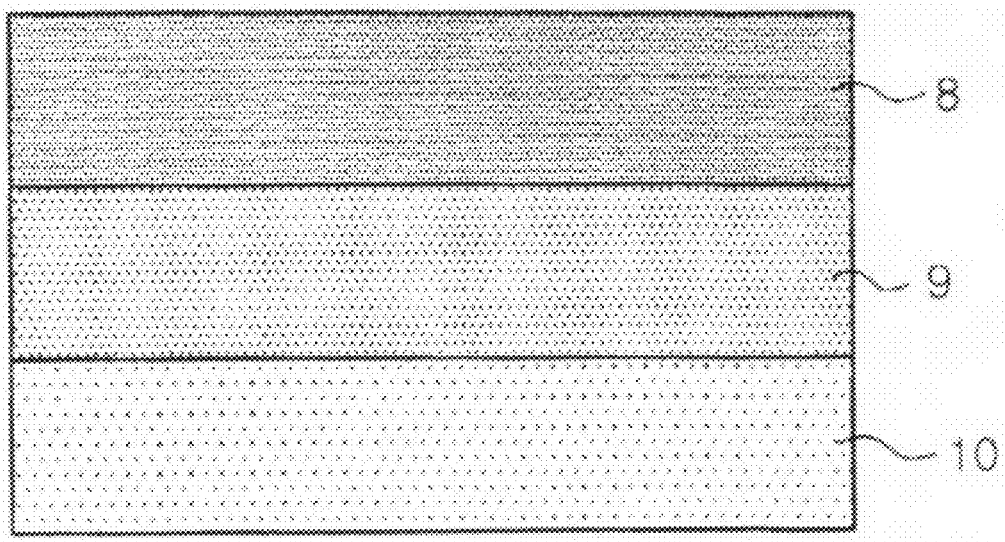
[Fig. 4]

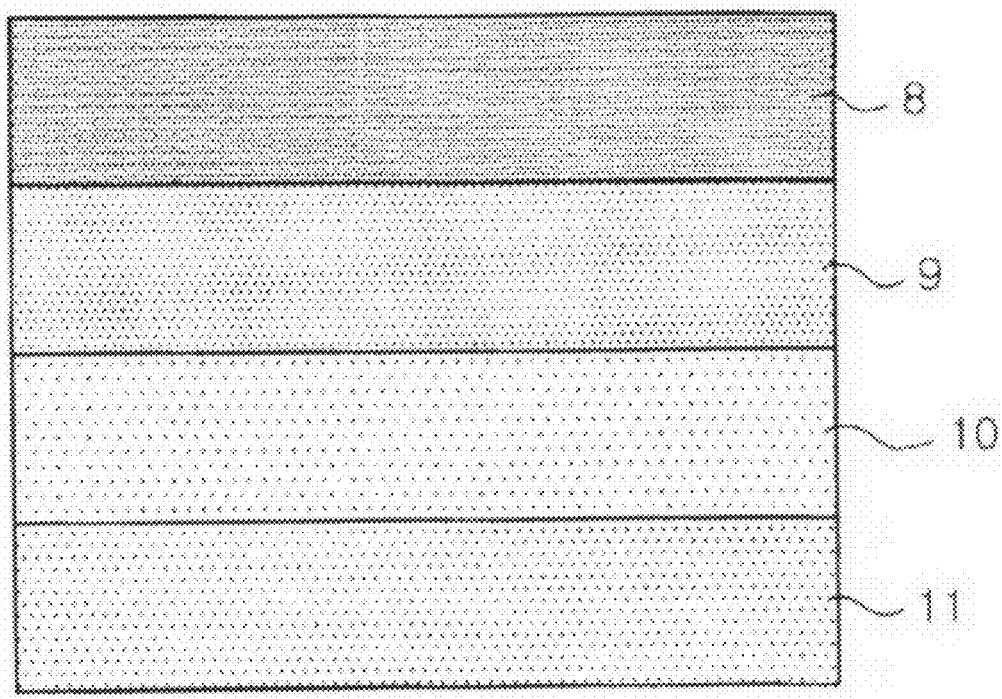
[Fig. 5]

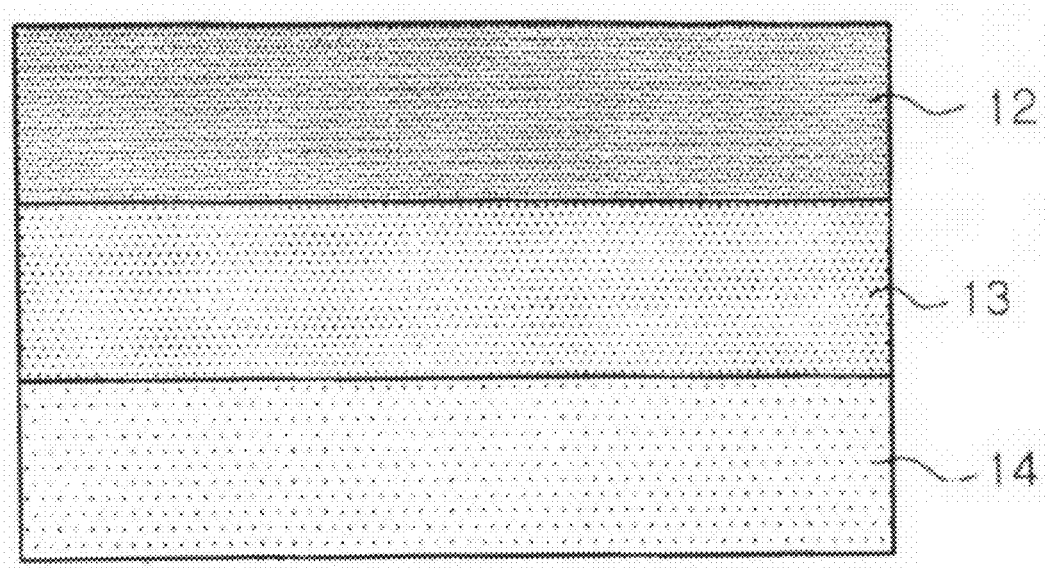
[Fig. 6]

[Fig. 7]
(a)
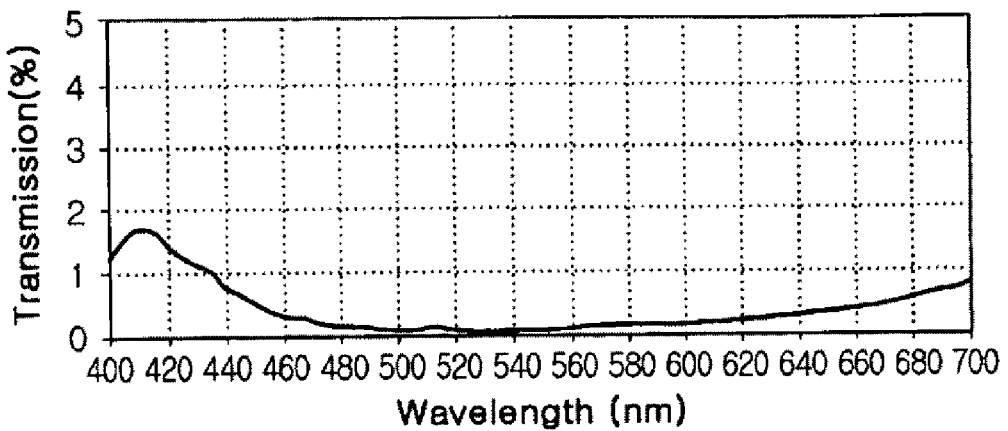
(b)
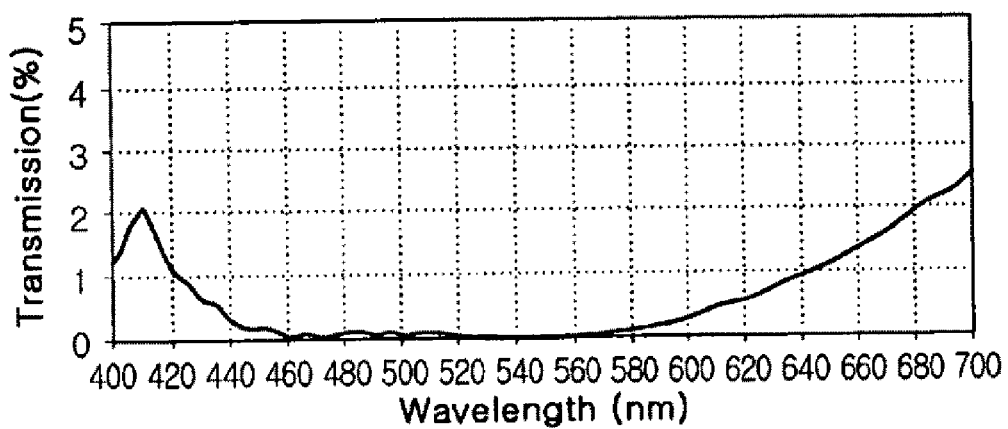
(c)
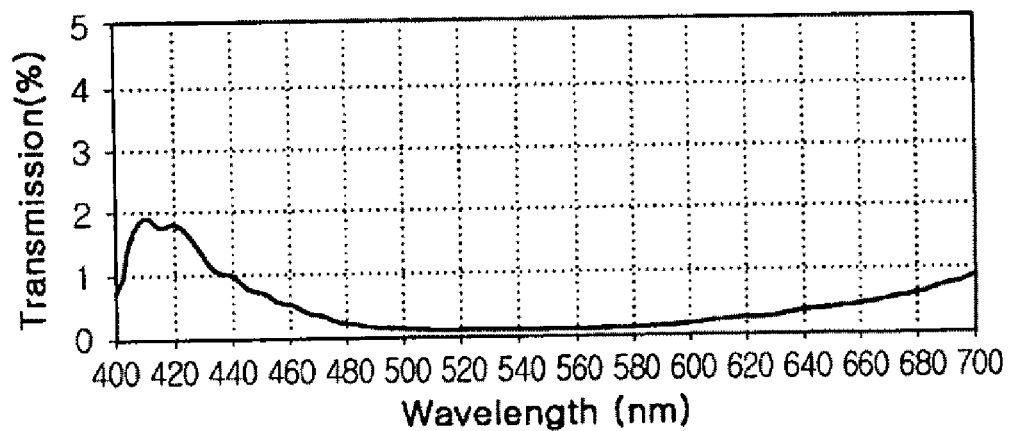

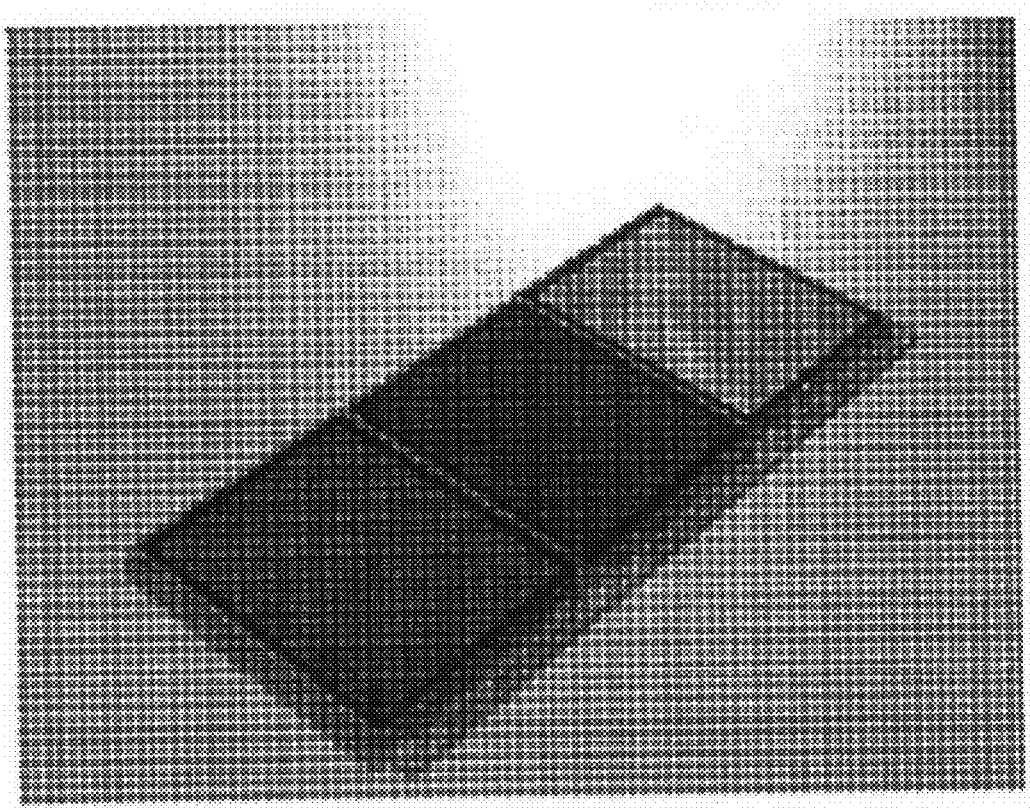
[Fig. 8]

VERY THIN ACHROMATIC QUARTER WAVE FILM LAMINATE FOR TRANSFLECTIVE LCD AND METHOD FOR PRODUCING THE SAME

This application claims the benefit of the filing date of Korean Patent Application No. 10-2006-0018746 filed on Feb. 27, 2006 in the Korean Intellectual Property Office and International Application PCT/KR2007/000968 filed Feb. 26, 2007, both of which are incorporated herein in its entirety by reference.

TECHNICAL FIELD

The present invention relates to a very thin achromatic quarter wave film for transflective LCD. More specifically, the present invention relates to a quarter wave film included in an LCD polarizer. Furthermore, the present invention relates to a very thin achromatic quarter wave film for transflective LCD having a considerably reduced thickness, as compared to conventional quarter wave films in which anisotropic polymeric films are laminated.

BACKGROUND ART

In transflective liquid crystal displays (LCDs), quarter wave film (a kind of phase difference film)s impart a phase difference of ¼ wavelength to linearly polarized light passing through a polarization film, thereby converting the linearly polarized light into circularly polarized light.

FIG. 1 is a cross-sectional view schematically illustrating the structure of a laminate constituting a transflective LCD. In FIG. 1, one section associated with indispensable elements of the present invention is enlarged for a better understanding of the present invention. In actual LCDs, an additional layer may be arranged, if necessary.

LCDs transmit information by blocking or transmitting light emitted from a backlight 7 based on polarization until the light is visible to the naked eye through a variety of paths. Generally, light emitted from backlight 7 is visible to the naked eye through a variety of paths, as shown in FIG. 1. Accordingly, the light emitted from backlight 7 can be partially seen to the naked eye.

Based on this point, there have been developed transflective LCDs. More specifically, while utilizing light commonly used in backlights, transflective LCDs reflect light in a region where a separate light source is provided, thereby exhibiting an improved brightness.

The transflective LCDs include the quarter wave films 2 and 5. The reason will be described with reference to FIGS. 1 and 2. In FIG. 2, a portion represented by "x" means that light is emitted to the inside of the LCD, and a portion represented by "•" means that light is emitted to the outside of the LCD.

First, a detailed description will be made with regard to a transflective LCD where an electric field is applied to a liquid crystal layer 3. Light supplied from an external light source, rather than a backlight, is linearly polarized while passing through an uppermost external polarization film 1 of the LCD (SN1). After passing through the quarter wave film 2, the linearly polarized light undergoes the phase difference of a ¼ wavelength, thus being converted into circularly polarized light (SN2). The circularly polarized light transmits the liquid crystal layer 3, to which an electric field is applied. As a result, the liquid crystal loses its original orientation, thus the orientation is changed. That is, the liquid crystal has no specific orientation causing phase difference, thus undergoing no change in polarization state (SN3). The circularly polarized light is reflected by a reflection plate 4 (SN4). The reflected circularly polarized light passes through the liquid crystal layer 3 while maintaining the same phase difference. As mentioned above, the liquid crystal layer 3 has no specific orientation to create a phase difference, thus undergoing no change in polarization state (SN5). The circularly polarized light retransmits the quarter wave film 2. At this time, the phase difference of a ¼ wavelength occurs. By adding this phase difference to the phase difference of a ¼ wavelength occurred in SN2, there occurs a total phase difference of a ½ wavelength. The light is finally converted into linearly polarized light equivalent to a 90 degrees rotation from the polarization direction of the linearly polarized light firstly transmitted to the polarization film 1 (SN6). As a result, the polarization direction of light which reaches the uppermost external polarization film 1 is perpendicular to that of the polarization film 1. The light fails to transmit the polarization film 1, thus being blocked by the polarization film 1. Accordingly, in a transflective LCD, where an electric field is applied to a liquid crystal layer 3, light supplied from the external source undergoes no reflection.

On the other hand, in a case where a liquid crystal layer 3 maintains its original orientation without any application of an electric field, the opposite result will be obtained as follows. Light supplied from an external light source is linearly polarized after passing through the polarization film 1 of the LCD (SY1). After passing through the quarter wave film 2, the linearly polarized light is converted into circularly polarized light (SY2). SY1 and SY2 are the same as described above. However, in transmission of the circularly polarized light into the liquid crystal layer 3, there be obtained results different as described above. More specifically, the liquid crystal layer 3 is free from an electric field, thus maintaining its original orientation due to the interaction with the orientation film. Accordingly, the phase difference of a ¼ wavelength can be obtained by controlling the thickness of the liquid crystal layer 3. For this reason, the circularly polarized light in SY2 undergoes a ¼ wavelength phase difference, thus being perpendicularly polarized to the linearly polarized light in SY1 (SY3). The linearly polarized light is reflected by a reflection plate 4 (SY4). The reflected linearly polarized light passes through the liquid crystal layer 3 while maintaining the same phase difference without any variation in polarization state. Similarly, the liquid crystal layer 3 maintains its original orientation, thus undergoing the phase difference of a ¼ wavelength. As a result, the linearly polarized light is converted into circularly polarized light undergoing a total phase difference of a ¾ wavelength (SY5). Then, the circularly polarized light retransmits the quarter wave film 2. At this time, the phase difference of a ¼ wavelength occurs. By adding this phase difference to the phase difference of a ¾ wavelength in the previous step, there occurs a total phase difference of a 1 wavelength (i.e., a phase difference of zero). As a result, the polarization direction of light which reaches the uppermost external polarization film is the same as that of the polarization film, thus transmitting the polarization film and being visible to the naked eye. Accordingly, the transflective LCD, where no electric field is applied to a liquid crystal layer 3, has an advantage of improvement in brightness owing to the external source.

As apparent the foregoing, the quarter wave film is an essential element of the transflective LCD.

As shown in FIG. 1, in addition to the quarter wave film 2 arranged on the liquid crystal layer 3, another quarter wave film needs to be arranged at an opposite side of the film 2. It is because additional ¼ wavelength phase difference is needed to allow light emitted from the backlight and transmitting a glass substrate 7 and a lower phase difference film 6 to transmit a upper phase difference film 1 with undergoing no phase difference (i.e., 1 wavelength phase difference) in case that an electric field is applied to a liquid crystal layer. That is to say, a liquid crystal layer in a region, where there is no reflection plate, has a relatively large thickness, as compared to the case of a region where there is a reflective plate. By controlling the thickness of the liquid crystal layer, the phase difference of a ½ wavelength can be obtained upon formation of an electric field. The addition of this phase difference to the phase difference of a ¼ wavelength caused by the phase difference film 2 makes a total phase difference of a ¾ wavelength. The resulting light is converted into circularly polarized light having the phase difference of a ¾ wavelength. To convert the circularly polarized light into linearly polarized light equivalent to the phase difference of a 1 wavelength, there is a need for another quarter wave film 5 to induce an additional occurrence of a quarter wave.

As noted above, the transflective LCD requires in total two quarter wave films.

As shown in FIG. 3, no phase difference film creates the phase difference of a ¼ wavelength in response to light of all wavelengths. That is, the level of the phase difference is varied depending upon the wavelength of light. As can be seen from the curve of FIG. 3, generally, the longer wavelength, the smaller phase difference level. For this reason, in a wavelength range except for a predetermined wavelength bandwidth, elliptically polarized light, rather than circularly polarized light is generated.

The elliptically polarized light makes it more difficult to control light transmittance based on polarization. To impart the phase difference of a ¼ wavelength to light of a wide wavelength bandwidth, the film essentially needs to be provided with achromaticity.

Generally, the occurrence of the phase difference of a ¼ wavelength for light of a wide wavelength bandwidth is obtained by laminating a ½ wavelength phase difference film and a ¼ wavelength phase difference film such that the ½ wavelength phase difference film crosses the ¼ wavelength phase difference film at a specific angle.

Accordingly, the quarter wave film represented by reference numerals "2 or 5" in FIG. 1 is not a single layer. As shown in FIG. 4, the quarter wave film has typically a structure of triple-layer laminate consisting of a ¼ wavelength phase difference film 8 or 10 and a ½ wavelength film 10 or 8 which are laminated together and an adhesive layer 9 arranged between the two films to impart binding force therebetween.

As the ¼ and ½ wavelength phase difference films, there is generally used a film made of a polymer capable of exhibiting anisotropy via stretching in a specific direction, e.g., a cycloolefin polymer (COP) or polycarbonate (PC) polymer. The quarter wave film has the structure of a quarter wave film laminate 3 obtained by forming phase difference films having a predetermined thickness and laminating the films via the adhesive layer.

Since the ¼ wavelength phase difference film and ½ wavelength phase difference film (phase difference films) are subjected to stretching to obtain anisotropy, they must be subjected to filmization prior to lamination. During the filmization, the phase difference films must have a sufficient thickness due to the filmization process. The minimal thickness of each film is about 40 μm. A total thickness the laminate consisting of the two films and the adhesive layer reaches about 100 μm.

Recent trends toward slimness of small-medium size display devices (e.g., cellular phones, PDAs and games) have continued. The phase difference film laminate having a large thickness (about 100 μm) has been a great obstacle to the slimness of the display device.

Display devices further include a scattering layer to enhance visibility. That is, upon general light reflection, light can be seen in a direction only where a reflection angle is the same as an incidence angle of a light source, thus making it extremely difficult to recognize a display image. The scattering layer serves to improve visibility via dispersion of light in a variety of directions. In addition, the scattering layer inhibits an occurrence of an interference fringe which is frequently created in transflective LCDs.

As shown in FIG. 5, the scattering layer 11 is generally arranged under the quarter wave film layer 10 at the side of the upper polarization film 1, thereby being used for a region being in contact with a panel. Although the scattering layer 11 is used as a separate scattering adhesive layer, the scattering adhesive layer has a thickness of several tens micrometers (μm), thus disadvantageously causing an increase in total thickness of the LCD.

DISCLOSURE OF INVENTION

Technical Problem

In attempts to solve the problems of the prior art, it is one object of the present invention to provide a very thin quarter wave film laminate having a total thickness of 10 μm or less suitable for use in a transflective LCD.

It is another object of the present invention to provide a method for producing the very thin quarter wave film laminate.

Technical Solution

In accordance with one aspect of the present invention, there is provided a very thin achromatic quarter wave film laminate for transflective LCD comprising: a lower phase difference film; an orientation film coated on the lower phase difference film; and a upper phase difference film coated on the orientation film, wherein the lower phase difference film and the upper phase difference film are made of liquid crystal.

Preferably, the orientation film may include 0.1 to 20 parts by weight of light-transmissive particles, based on 100 parts by weight of a base material for the orientation film. Preferably, the light-transmissive particles have a diameter of 1 to 5 μm and a refractive index of 1.4 to 1.7.

Preferably, the lower phase difference film and the upper phase difference film may be made of photo-polymerized acrylate liquid crystal.

The one selected from the lower phase difference film and the upper phase difference film may be a ¼ wavelength phase difference film and the other may be a ½ wavelength phase difference film.

In the case that one of the lower and the upper phase difference films is a ¼ wavelength phase difference film, the ¼ wavelength phase difference film may have preferably a thickness of 1 to 1.5 μm.

In the case that one of the lower and the upper phase difference films is a ½ wavelength phase difference film, the ½ wavelength phase difference film may have preferably a thickness of 1.6 to 2.3 μm.

To impart achromaticity and quarter wave film performance to the phase difference film laminate, the ¼ and the ½ wavelength phase difference films may be preferably arranged such that they crosses each other at an angle of 60 to 90 degrees.

In accordance with another aspect of the present invention, there is provided a method for manufacturing a very thin achromatic quarter wave film laminate for transflective LCD: preparing a polymeric substrate oriented in a specific direction; coating a liquid crystal solution on the polymeric substrate; subjecting the coating to drying and UV curing to form a lower liquid crystal layer; coating a solution for an orientation film on the lower liquid crystal layer; drying the coating to form an orientation film; imparting orientation to the orientation film via polarization UV radiation or rubbing; coating a liquid crystal solution on the orientation film; and subjecting the coating to drying and UV curing to form a upper liquid crystal layer.

The orientation film may preferably include 0.1 to 20 parts by weight of light-transmissive particles, based on 100 parts by weight of a base material for the orientation film. Preferably, the light-transmissive particles have a diameter of 1 to 5 μm and a refractive index of 1.4 to 1.7.

The liquid crystal solution used in the coating of the lower liquid crystal layer and the upper liquid crystal layer preferably contains photo-polymerizable acrylate.

Preferably, the one selected from the lower liquid crystal layer and the upper liquid crystal layer may be formed of a ¼ wavelength phase difference film, and the other may be formed of a ½ wavelength phase difference film.

Preferably, the liquid crystal solution may be coated such that the ¼ wavelength phase difference film has a thickness of 1 to 1.5 μm.

Preferably, the liquid crystal solution may be coated such that the ½ wavelength phase difference film has a thickness of 1.6 to 2.3 μm.

To impart achromaticity and quarter wave film performance to the phase difference film laminate, the ¼ and the ½ wavelength phase difference films may be preferably coated such that they crosses each other at an angle of 60 to 90 degrees.

If necessary, the method may further comprise subjecting the coating to UV curing, after the drying the coating used in formation for an orientation film.

To form a uniform and thin film, the coating of the liquid crystal solution may be preferably carried out by solution casting.

Similarly, the coating of the orientation film may be carried out by solution casting.

ADVANTAGEOUS EFFECTS

According to the present invention, there can be achieved a very thin achromatic quarter wave film laminate having 3% of the thickness of conventional laminates. The very thin achromatic quarter wave film laminate exhibits excellent scattering characteristics of prevention of an occurrence of interference fringe and good visibility, and superior achromaticity despite of its small thickness.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross-sectional view schematically illustrating the structure of a laminate constituting a transflective LCD;

FIG. 2 is a flow chart illustrating polarization while external light is reflected to a transflective LCD;

FIG. 3 is a graph illustrating distribution characteristics of a phase difference film whose phase difference is varied depending upon the wavelength of light;

FIG. 4 is a cross-sectional view illustrating the structure of a conventional achromatic ¼ wavelength phase difference film laminate;

FIG. 5 is a cross-sectional view illustrating the structure of a achromatic ¼ wavelength phase difference film laminate to which a scattering layer is added;

FIG. 6 is a cross-sectional view illustrating the structure of a achromatic ¼ wavelength phase difference film laminate according to the present invention;

FIG. 7 is graphs illustrating a comparison in achromaticity between the conventional ¼ wavelength phase difference film laminates and the ¼ wavelength phase difference film laminate according to the present invention, respectively:

FIG. 7a is a graph illustrating a measurement result of a reflection ratio of a quarter wave film laminate, where two COP films are joined via an adhesive, at each wavelength;

FIG. 7b is a graph illustrating a measurement result of a reflection ratio of a monolayer-phase difference film (obtained from Teijin) at each wavelength; and FIG. 7c is a graph illustrating a measurement result of a reflection ratio of the quarter wave film laminate in Example 1 of the present invention; and FIG. 8 is a view illustrating a result of scattering performance of the orientation film in the ¼ achromatic phase difference film laminate according to the present invention evaluated from an occurrence of interference fringe.

BEST MODE FOR CARRYING OUT THE INVENTION

The present invention will now be described in greater detail.

The present inventors examined thoroughly problems associated with a conventional method for manufacturing a quarter wave film laminate, in which anisotropic polymeric films are laminated via an adhesive. As a result, the present inventors concluded that a reduction in the thickness of a quarter wave film laminate is infeasible, in a case where each anisotropic polymeric film is used for a phase difference film. After repeated searches for a novel desired laminate, the present invention has been finally completed.

In conventional methods, polymeric films are formed, and the polymeric films are then subjected to stretching, thereby imparting anisotropy to the polymeric films. Subsequently, the two films are laminated and joined via an adhesive such that they cross each other at a specific angle. On the contrary, according to the present invention, there is provided an achromatic quarter wave film layer, where a very thin ½ and ¼ wavelength phase difference films are laminated by coating.

Each wavelength phase difference film is made of a liquid crystal oriented in a predetermined orientation, rather than materials, e.g., cycloolefin (COP) and poly-carbonate (PC) polymers, which are used in conventional methods. In a case that a liquid crystal is mixed with an organic solvent, the mixture can be uniformly dispersed on the surface of the film to be coated owing to its proper viscosity, thus enabling formation of a very thin coating layer having an extremely small thickness. Accordingly, the use of the liquid crystal for a phase difference film ensures the formation of a thin film layer having a thickness of several micrometers (μm) or less.

Preferably, the liquid crystal is made of a polymeric material. The polymeric liquid crystal material has the advantages in that it is oriented in a predetermined orientation during drying after coated in a state of isotropic material and the problem of returning to isotropic state can be prevented since it is cured by the polymerization reaction during UV radiation.

In particular, a photopolymerizable acrylate monomer or a mixture thereof is preferably used as the polymeric liquid crystal material. Furthermore, preferred is a use of the liquid crystal having a planar orientation in one axis.

As the liquid crystal monomer satisfying the requirements of the preferable acrylate-based liquid crystal, there may be preferably used a low-molecular weight liquid crystal having a nematic phase at a room or high temperature. Suitable examples of the nematic phase liquid crystal monomer include cyanobiphenyl-based acrylate, cyanophenyl cyclohexane-based acrylate, cyanophenyl ester-based acrylate, phenyl ester benzoate-based acrylate, phenylpyrimidine acrylate and a mixture thereof.

In addition, the liquid crystal may comprise a desired amount of a photo-polymerization initiator.

As mentioned above, the quarter wave film of the present invention is a laminate consisting of a ¼ wavelength phase difference film and a ½ wavelength phase difference film. In conventional methods, in a case that an anisotropic polymeric film made of a material such as a cycloolefin polymer (COP) or polycarbonate (PC) is used in the lamination of the ¼ and ½ wavelength phase difference films, a large-thickness adhesive layer is required to secure a binding force between the two films. On the contrary, according to the present invention where a very thinly coated liquid crystal layer is utilized in each phase difference film, the very thinly coated orientation film, rather than the thick adhesive layer, is formed on the underlying substrate and phase difference film. Hereinafter, for convenience, the orientation film coated on the underlying substrate will be referred to as a "first orientation film". The orientation film coated on the lower phase difference film will be referred to as a "second orientation film" or "intermediate layer". A simple description as "orientation film (s)" means all of first and second orientation films. Although will be mentioned above, in a case where a rubbing orientation film is formed between liquid crystal layers, a rubbed polymeric substrate may be used as a substrate for the orientation film. Accordingly, the first orientation film may be unnecessary.

The orientation film aims to impart orientation in a specific direction to the phase difference film formed thereon. The orientation film must have an orientation. The orientation of the orientation film may be carried out by rubbing or optical-orienting. The optical-orienting may be performed under the condition that polarized UV is used in curing.

In a case that a laminate includes the orientation film obtained by optical orientation, the first orientation film is laminated by coating on the substrate. Accordingly, the orientation film can be adjusted to a small thickness of about 250 to about 350 nm (about 0.25 to 0.35 μm). In the following process, the phase difference film may be formed by coating on the orientation film. The second orientation film (i.e., intermediate layer) is laminated by coating on the coated lower phase difference film. The thickness of the second orientation film may be determined depending upon the strength of light scattering property and adhesion force. In general, the thickness of the coated orientation film is preferably about 0.1 to 20 μm, more preferably about 1 to 1 μm, in view of a particle projection area. Then, another phase difference film may be directly formed by coating, thus eliminating the necessity of the thick adhesive layer.

Preferably, the optical orientation film is made of a light-transmissive resin. Preferred is use of a multicyclic compound having a photo-reactive group-containing main chain dissolved in a solvent. Suitable examples of the multicyclic compound include a norbornene polymer. Suitable examples of the solvent include cyclopentanone.

In the phase difference film of the present invention, there may used a polymer derived from a polymerization repeated unit (i.e., monomer) represented by the following Formula 1 as an optical-orienting material, which is a multicyclic compound having a photo-reactive group used in the formation of the orientation film (polymeric film).

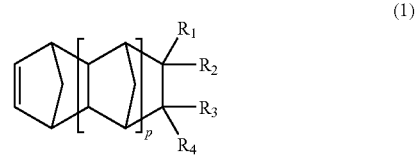

wherein P is an integer of 0 to 4;
at least one of $R_1$, $R_2$, $R_3$ and $R_4$ is selected form the group consisting of the following structural formulas a, b, c, and d; and the others are independently selected from the group consisting of: hydrogen; halogen; substituted or unsubstituted $C_1$-$C_{20}$ alkyl; substituted or unsubstituted $C_2$-$C_{20}$ alkenyl; substituted or unsubstituted, saturated or unsaturated $C_5$-$C_{12}$ cycloalkyl; saturated or unsaturated $C_6$-$C_{40}$ aryl, substituted or unsubstituted $C_7$-$C_{15}$ aralkyl; substituted or unsubstituted $C_2$-$C_{20}$ alkynyl; and polar non-hydrocarbonic group containing at least one selected from the group consisting of oxygen, nitrogen, phosphorus, sulfur, silicon and boron;
$R_1$ and $R_2$, or $R_3$ and $R_4$ are each joined together to form $C_1$-$C_{10}$ alkylidene, or $R_1$ or $R_2$ is joined with one of $R_3$ and $R_4$ to form substituted or unsubstituted $C_4$-$C_{12}$ cycloalkyl, or a $C_6$-$C_{24}$ aromatic cyclic compound,

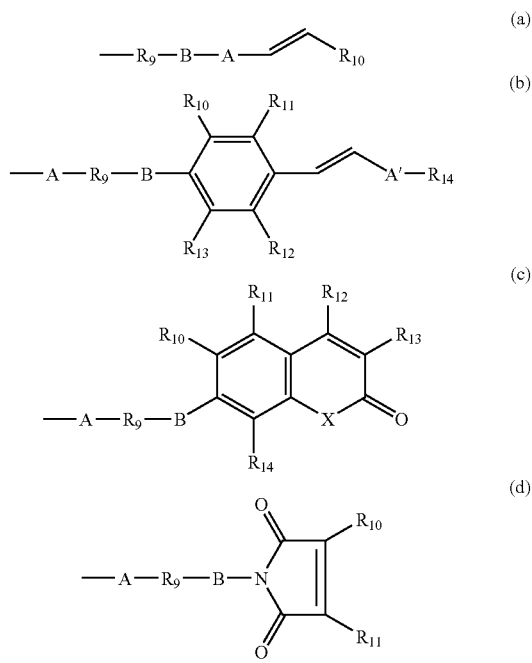

where in Formulas a, b, c and d,
A and A' are independently selected from the group consisting of substituted or unsubstituted $C_1$-$C_{20}$ alkylene, carbonyl, carboxyl, and substituted or unsubstituted $C_6$-$C_{40}$ arylene;

B is oxygen, sulfur or —NH—;

X is oxygen or sulfur;

$R_9$ is selected from the group consisting of a single bond, substituted or un-substituted $C_1$-$C_{20}$ alkylene; substituted or unsubstituted $C_2$-$C_{20}$ alkenylene; substituted or unsubstituted, saturated or unsaturated $C_5$-$C_{12}$ cycloalkylene; substituted or unsubstituted $C_6$-$C_{40}$ arylene; substituted or unsubstituted $C_7$-$C_{15}$ aralkylene; and substituted or unsubstituted $C_2$-$C_{20}$ alkynyl; and $R_{10}$, $R_{11}$, $R_{12}$, $R_{13}$ and $R_{14}$ are independently selected from the group consisting of substituted or unsubstituted $C_1$-$C_{20}$ alkyl, substituted or unsubstituted $C_1$-$C_{20}$ alkoxy, substituted or unsubstituted $C_6$-$C_{30}$ aryloxy, and substituted or unsubstituted $C_6$-$C_{40}$ aryl.

The polymer derived from the monomer of the Formula 1 has preferably a degree of polymerization of 50 to 5,000. In case that a polymerization degree is lower than 50, realization of good orientation is impossible. On the other hand, when a polymerization degree is higher than 5,000, the viscosity of the monomer based on the molecular weight thereof increases, thus making it difficult to coat the orientation film to the desired thickness.

Similarly, in a case that an orientation film is obtained by rubbing, the orientation film is laminated by coating on the lower phase difference film. Accordingly, the orientation film can be adjusted to a relatively small thickness of about 1 to about 5 µm. In the following process, another phase difference film may be formed by coating on the orientation film, thus eliminating the necessity of the thick adhesive layer.

The rubbing orientation film is made of a light-transmissive resin. Suitable examples of the polymer constituting the rubbing orientation film include polymethyl methacrylate, acrylate/methacrylate copolymer, polyvinyl alcohol, modified-polyvinyl alcohol, poly(N-methylol acrylamide), styrene/vinyl toluene copolymer, chloro sulfonated polyethylene, nitrocellulose, chlorinated polyolefin, polyester, polyimide, vinyl acetate/vinyl chloride copolymer, ethylene/vinyl acetate copolymer, cellulose acetate, polyethylene, polypropylene, and polycarbonate.

The rubbing orientation film may comprise a cross-linking agent. The cross-linking agent includes at least one selected from pentaerythritol tri(met)acrylate, triglycerol di(met)acrylate, tripropylene glycol di(met)acrylate, tetraethylene glycol di(met)acrylate, pentaerythritol di(met)acrylate, 1,6-hexanediol di(met)acrylate, glycerol di(met)acrylate, 2-hydroxyethyl di(met)acrylate, 2-hydroxypropyl (met)acrylate, methoxyethyl (met)acrylate, N,N-dimethylaminoethyl (met)acrylate and butoxy triethylene glycol (met)acrylate. The cross-linking agent may be used in an amount of 1 to 20% by weight, with respect to the total orientation film composition. In a case where a cross-linking agent is lower than 1% by weight, it is difficult to induce cross-linking reaction. Meanwhile, in a case where a cross-linking agent is higher than 20% by weight, the cross-linking agent causes a deterioration in orientating qualities of the orientation film. Accordingly, preferred is use of the cross-linking agent within the range defined above.

Based on the foregoing, the structure of the quarter wave film laminate of the present invention will be described in detail. As shown in FIG. 6, the quarter wave film laminate has a triple-layer structure consisting of the ¼ wavelength phase difference film 12 or 14, the orientation film 13, and the ½ wavelength phase difference film 14 or 12. The top and bottom arrangement of the ½ wavelength phase difference film and ¼ wavelength phase difference film is particularly not limited. That is to say, the upper phase difference film 12 may be either the ½ wavelength phase difference film or the ¼ wavelength phase difference film. In addition, in a case that an orientation film is optically oriented, it is desired to form an optical-orientation film on a substrate, and form a lower phase difference film on the optical-orientation film. Therefore, an optical-orientation film may be additionally formed under the lower phase difference film.

To impart achromaticity to the laminate, the orienting direction of the ½ wavelength phase difference film preferably crosses that of the ¼ wavelength phase difference film at an angle of 60 to 90 degrees.

The phase difference caused by each phase difference film is determined depending upon the texture and thickness thereof. Therefore, to use a film layer as the phase difference film, the thickness of the film layer must be adjusted to a desired level. In a case where the film layer is made of the photo-polymerizable acrylate-based liquid crystal mixture according to the present invention, the thickness of the ½ wavelength phase difference film is preferably adjusted to 1.6 to 2.3 µm, and the thickness of the ¼ wavelength phase difference film is preferably adjusted to 1 to 1.5 µm. The film thickness is slightly varied by the type of acrylate used.

The lower phase different film is formed on the polymeric substrate capable of inducing a liquid crystal orientation regardless of the type thereof (i.e., regardless of the ½ and the ¼ wavelength phase difference film). Any polymer may be used for the polymeric substrate without particular limitation so long as it induces a liquid crystal orientation. Suitable examples of the polymer include polymethyl methacrylate, acrylate/methacrylate copolymer, polyvinyl alcohol, modified-polyvinyl alcohol, poly(N-methylol acrylamide), styrene/vinyl toluene copolymer, chloro sulfonated polyethylene, nitrocellulose, chlorinated polyolefin, polyester, polyimide, vinyl acetate/vinyl chloride copolymer, ethylene/vinyl acetate copolymer, cellulose acetate, polyethylene, polypropylene, and polycarbonate. Preferred are polymethyl methacrylate, polyvinyl alcohol, modified-polyvinyl alcohol, polyester, cellulose acetate, and polycarbonate.

The quarter wave film laminate of the present invention can be readily separated from the polymeric substrate. Therefore, the laminate, from which the polymeric substrate is removed, may be utilized in a final use.

The phase difference films constituting the quarter wave film laminate of the present invention may be made of same or different material with respect to each other under the conditions that they completely satisfy the requirements.

It is a more preferable advantage of the quarter wave film laminate that the orientation film simultaneously serves as a scattering layer. As mentioned above, the scattering layer is included in the laminate to improve visibility so that a screen of a display device can be seen in a variety of angles. The scattering layer may cause an increase in the thickness of the display device. It is preferable to make the scattering layer thickness as small as possible. Particularly, it is preferable that there is no separate scattering layer.

The present inventors have discovered the fact that particles satisfying the requirements serve as a scattering layer in the polymer constituting the orientation film. Based on the fact, more preferable embodiments of the present invention have been accomplished.

In a case that the above-mentioned polymer comprises light-transmissive particles selected from organic polymer (e.g., polystyrene or polymethyl methacylate) beads, silica ($SiO_2$), and silver or alumina-based inorganic particle beads, the orientation film capable of scattering light can be manufactured. At this time, the light-transmissive particles preferably have a diameter of 1 to 5 µm. In addition, to impart light-scattering performance as well as light-transmitting performance to the particles, the particles preferably have a refractive index of 1.4 to 1.7. More specifically, when the light-transmissive particles have an excessively small or large diameter, with respect to the wavelength of incident light, Rayleigh scattering or diffraction-induced scattering may occur. As a result, polarization, e.g., straight linear polarization, may be unintentionally offset. Backward scattering rather than forward scattering may unexpectedly occur. Accordingly, the use of the orientation film, in which particles satisfying the requirements of diameter and refractive index are dispersed, enables the particles to exhibit the desired scattering performance.

Preferably, the internal scattering layer of the orientation film has a haze of 30 to 80%. The haze can be controlled depending upon the content of the light-transmissive particles. Preferably, the content of the light-transmissive particles is 0.1 to 20 parts by weight, based on 100 parts by weight of a main material for the orientation film.

After mixed with a solution, in which a main material is dissolved, the light-transmissive particles are dispersed in the orientation film. At this time, the solution may further comprise a small amount of a dispersant to facilitate dispersion.

Any one of the fore-mentioned orientation film materials may be used without particularly limitation for the main material constituting the scattering orientation film. More preferred is a water-soluble polymer such as polyvinyl alcohol, modified-polyvinyl alcohol, poly(N-methylol acrylamide), and carboxylmethyl cellulose. As such, the scattering orientation film may further comprise a dispersant.

Preferably, the quarter wave film laminate has a structure where the orientation film is arranged between the ½ wavelength phase difference film and the ¼ wavelength phase difference film. Preferably, organic or inorganic light-transmissive particles having a diameter of 1 to 5 μm are densely dispersed in the orientation film.

The quarter wave film laminate is manufactured in accordance with the following method. The method for manufacturing the quarter wave film laminate of the present invention is slightly varied depending upon the type of the orientation film (i.e., optical-orientation film or rubbing-treated orientation film).

First, a substrate is prepared for use in formation of a phase difference film. Any polymer may be used for the substrate without particular limitation so long as it induces a liquid crystal orientation. Suitable examples of the polymer include polymethyl methacrylate, acrylate/methacrylate copolymer, polyvinyl alcohol, modified-polyvinyl alcohol, poly(N-methylol acrylamide), styrene/vinyl toluene copolymer, chloro sulfonated polyethylene, nitrocellulose, chlorinated polyolefin, polyester, polyimide, vinyl acetate/vinyl chloride copolymer, ethylene/vinyl acetate copolymer, cellulose acetate, polyethylene, polypropylene, and polycarbonate. Preferred are polymethyl methacrylate, polyvinyl alcohol, modified-polyvinyl alcohol, polyester, cellulose acetate, and polycarbonate. As mentioned in the following, the polymeric substrate may be removed after formation of the film laminate is completed.

In a case where an optical-orientation film is utilized in inducing a liquid crystal orientation, there is no limitation as to the substrate. On the other hand, in a case where a rubbing-orientation film is utilized in inducing a liquid crystal orientation, it is preferable to use a polymeric substrate rubbed in a specific direction.

Then, the substrate is coated with a liquid crystal solution for the formation of a lower phase difference film 14. At this time, the liquid crystal solution may be prepared by dissolving the liquid crystal material in a toluene-based solvent. The liquid crystal solution comprises 20 to 40% by weight of the liquid crystal material and 60 to 80% by weight of the solvent. The coating of the liquid crystal solution is preferably carried out by solution casting to realize formation of uniform and thin coating. In a case that an optical-orientation film is used for the orientation film arranged between the upper and lower phase different films, there is a need for a further process of forming the orientation film including coating the substrate with a material for a first orientation film, followed by drying and polarization UV radiation, prior to the coating of the liquid crystal solution. The first orientation film material is the same as follows.

The coated liquid crystal solution is subjected to drying and UV curing to form a phase difference film layer 14 (lower difference film layer) oriented in a specific direction.

The drying is preferably carried out in a dry oven at a temperature of 25 to 70° C. for 1 to 5 min. The drying temperature considerably affects orientation, arrangement and position of the liquid crystal. When the drying is carried out at a temperature out of the desired range, an undesired orientation may be occurred. An insufficient drying may result in defects, e.g., spots. Accordingly, the drying is preferably carried out for 1 min or more. The drying for about 5 min is sufficient. Therefore, the drying time is defined as 1 to 5 min.

The UV curing is carried out in accordance with a conventional liquid crystal curing method.

Then, a polymeric solution is coated on the liquid crystal layer, followed by drying, for the formation of an orientation film 13 on the liquid crystal solution.

The polymeric solution is prepared by dissolving the material suitable for the orientation film in a solvent. To impart scattering capability to the orientation film, the light-transmissive particles are added to the polymeric solution according to the condition described above. Suitable examples of the solvent include an organic solvent, e.g., methyl ethyl ketone, and a mixed solvent of water and methanol. To ensure the desired coatability, the orientation film material may be preferably used in an amount of 1 to 20% by weight, based on the weight of the solution. In a case that the light-transmissive particles are used to impart scattering capability to the orientation film, a dispersant may be used in a small amount to facilitate the dispersion of the light-transmissive particles.

The solution obtained by the procedure can be uniformly and thinly coated by solution casting on the surface of the lower phase difference film 14.

Subsequently, the coated solution is subjected to drying. The drying of the coated solution is performed in the same manner as in the drying of the lower phase different film 14, except that the drying is preferably carried out at a temperature of 80 to 100° C. slightly higher than that of the lower phase difference film 14, upon a use of a water-soluble polymer, such as polyvinyl alcohol, modified-polyvinyl alcohol, poly(N-methylol acrylamide), or carboxyl methyl cellulose.

The orientation film 13 thus formed has no anisotropy in a specific direction. To impart anisotropy to the orientation film 13, the orientation film 13 is subjected to optical-orientation by rubbing in the desired direction or polarization UV radiation.

To form another phase difference film 12 (upper phase difference film layer) on the orientation film 13, a liquid crystal solution is subjected to a series of coating, drying and UV curing.

A series of processes, i.e., coating, drying and UV curing, used in the formation of the lower phase difference film 14 are also applied to the formation of the upper phase difference film 12.

Thereafter, the lowermost polymeric substrate used in the formation of the lower phase difference film 14 may be removed, if necessary.

MODE FOR THE INVENTION

The present invention will be better understood from the following examples. These examples are not to be construed as limiting the scope of the invention.

EXAMPLES

Example 1

Formation of Achromatic Quarter Wave Film Laminate

A polymeric substrate made of polyester was subjected to surface-rubbing by rolling a rubbing roll. Rayon was used as a rubbing cloth.

Then, the polymeric substrate was surface-coated with a liquid crystal solution where 20% by weight of cyanobiphenyl acrylate is dissolved in 80% by weight of toluene. The coating is adjusted to a thickness of about 1 μm to obtain a ¼ wavelength phase difference film layer. The isotropic liquid crystal layer thus coated is dried in a dry oven at 25° C. for 1 min to allow the ¼ wavelength phase difference film layer oriented in a specific direction to be fixed. The resulting ¼ wavelength phase difference film layer is cured by UV curing to form a strong ¼ wavelength phase difference film.

Polystyrene beads having a diameter of 1 to 3 μm as light-transmissive particles were mixed with 100 parts by weight of UV curing-polyvinyl alcohol. The mixture was dissolved in a mixed solvent of water and ethanol. The content of the polyvinyl alcohol of the solution was 4% by weight. The solution was coated by solution-casting on a lower phase difference film layer. The coated polymeric solution layer was dried at 80° C. to form a polymeric film layer. Then, the polymeric film layer was rubbed with a rubbing cloth such that it crosses the underlying ¼ wavelength phase difference film at an angle of 60 degrees, to form an orientation film. The thickness of the orientation film was about 300 nm.

Then, a ½ wavelength phase difference film having a thickness of 1.6 μm was formed on the orientation film in the same manner as in formation of the ¼ wavelength phase difference film.

In accordance with the procedure, there was obtained a quarter wave film laminate consisting of the ¼ wavelength phase difference film, the orientation film, and the ½ wavelength phase difference film laminated in this order. The thickness of the laminate except for the thickness of the lowermost polymeric substrate was about 3 μm. As could be seen from the foregoing, the very thin achromatic quarter wave film laminate had 3% of the thickness of the conventional laminate having a thickness of 100 μm in which anisotropic polymeric films are joined together via an adhesive.

Example 2

Evaluation for Achromaticity of Quarter Wave Film Laminate

The wavelength bandwidth the quarter wave film laminate thus manufactured in Example 1 exhibits achromaticity was analyzed with a double refraction measuring system. The achromaticity depends on the double refraction measurement. There was made a comparison in achromaticity between a phase difference film made of a COP (cycloolefin polymer) film used for a conventional quarter wave film laminate, and an achromatic monolayer-phase difference film (obtained from Teijin).

The results were shown in FIG. 7. FIG. 7*a* is a graph illustrating a measurement result of a reflection ratio of a quarter wave film laminate, where two COP films are joined via an adhesive, at each wavelength. FIG. 7*b* is a graph illustrating a measurement result of a reflection ratio of a monolayer-phase difference film (obtained from Teijin) at each wavelength. FIG. 7*c* is a graph illustrating a measurement result of a reflection ratio of the quarter wave film laminate in Example 1 of the present invention.

It could be confirmed from that the phase difference film in Example 1 (FIG. 7*c*) and the phase difference film obtained by laminating two COP films (FIG. 7*a*) exhibited a broad range in wavelength where there hardly occurs reflection. On the contrary, the monolayer-phase difference film had a small range in wavelength where there is no reflection, and a relatively significantly high reflection ratio at a long wavelength, as shown in FIG. 7*b*.

As apparent from the foregoing, the quarter wave film laminate according to the present invention has a wavelength range capable of exhibiting achromaticity comparable to conventional laminates, while having a considerably reduced thickness, as compared to the conventional laminates.

Example 3

Evaluation for Interference Fringe

To observe an occurrence of interference fringe, sunlight-reflection were tested for the phase difference film laminate in Example 1 (panel 1), a case where an LCD panel is used only (panel 2), and a case where a polarization sheet is used only (panel 3). Each reflection plate used herein had a structure where each film is laminated on a 2 inch of transflective panel. The reflection color and pattern in front of and at an angle of about 45 degrees of transmissive reflective light using each panel were observed with the naked eye. The results were evaluated on the basis of the following criteria.

The image of each panel reflecting external light was shown in FIG. 8. From left to right, there was arranged the case where a polarization sheet is used only (panel 3), the phase difference film laminate in Example 1 (panel 1), and the case where an LCD panel is used only (panel 2).

The three panels were evaluated for reflection to an external light (interference fringe). The results were shown in Table 1.

TABLE 1

| Type | Reflection performance to external light |
|---|---|
| Panel 1 | A |
| Panel 2 | C |
| Panel 3 | B |

A: No interference fringe
B: dim interference fringe pattern
C: clear interference fringe pattern (overwhelmed by external light)

In the phase difference film laminate in Example 1 (panel 1), there was no interference fringe. On the other hand, in the case where an LCD panel is used only (panel 2), there was considerably excessive interference fringe. It could be confirmed that the interference fringe cannot be completely removed, although a polarization sheet is disposed on the panel.

As could be seen form the foregoing, the quarter wave film laminate according to the present invention has a wavelength range capable of preventing interference fringe comparable to conventional laminates, where a scattering adhesive layer is separately formed, while having a considerably reduced thickness, as compared to conventional laminates. Accordingly, the excellence of the quarter wave film laminate could be confirmed.

INDUSTRIAL APPLICABILITY

As apparent from the foregoing, according to the present invention, there can be achieved an very thin achromatic quarter wave film laminate having 3% of the thickness of conventional laminates. The very thin achromatic quarter wave film laminate exhibits excellent scattering characteristics of prevention of an occurrence of interference fringe and good visibility, and superior achromaticity despite of its small thickness.

The invention claimed is:

1. A very thin achromatic quarter wave film laminate for transflective LCD comprising:
   a lower phase difference film;
   an orientation film coated on the lower phase difference film;
   an upper phase difference film coated on the orientation film,
   wherein the lower phase difference film and the upper phase difference film are made of liquid crystal, and
   wherein one selected from the lower phase difference film and the upper phase difference film is a ¼ wavelength phase difference film and the other is a ½ wavelength phase difference film.

2. The very thin achromatic quarter wave film laminate for transflective LCD according to claim 1, wherein the orientation film includes 0.1 to 20 parts by weight of light-transmissive particles, based on 100 parts by weight of a base material for the orientation film.

3. The very thin achromatic quarter wave film laminate for transflective LCD according to claim 2, wherein the light-transmissive particles have a diameter of 1 to 5 μM.

4. The very thin achromatic quarter wave film laminate for transflective LCD according to claim 3, wherein the light-transmissive particles have a refractive index of 1.4 to 1.7.

5. The very thin achromatic quarter wave film laminate for transflective LCD according to claim 1, wherein the lower phase difference film and the upper phase difference film are made of photo-polymerized acrylate liquid crystal.

6. The very thin achromatic quarter wave film laminate for transflective LCD according to claim 1, wherein the ¼ wavelength phase difference film has a thickness of 1 to 1.5 μM.

7. The very thin achromatic quarter wave film laminate for transflective LCD according to claim 1, wherein the ½ wavelength phase difference film has a thickness of 1.6 to 2.3 μM.

8. The very thin achromatic quarter wave film laminate for transflective LCD according to claim 1, wherein the ¼ wavelength phase difference film and the ½ wavelength phase difference film are arranged such that the ¼ wavelength phase difference film crosses the ½ wavelength phase difference film at an angle of 60 to 90 degrees.

* * * * *